(12) United States Patent
Kobayashi

(10) Patent No.: US 11,936,493 B2
(45) Date of Patent: Mar. 19, 2024

(54) ONBOARD APPARATUS, ONBOARD COMMUNICATION SYSTEM, AND COMMUNICATION CONTROL METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Takuya Kobayashi, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 18/001,135

(22) PCT Filed: May 27, 2021

(86) PCT No.: PCT/JP2021/020117
§ 371 (c)(1),
(2) Date: Dec. 8, 2022

(87) PCT Pub. No.: WO2021/251149
PCT Pub. Date: Dec. 16, 2021

(65) Prior Publication Data
US 2023/0216704 A1 Jul. 6, 2023

(30) Foreign Application Priority Data
Jun. 12, 2020 (JP) ................................ 2020-101979

(51) Int. Cl.
*G06F 15/173* (2006.01)
*B60R 16/023* (2006.01)
(Continued)

(52) U.S. Cl.
CPC ........ *H04L 12/2838* (2013.01); *B60R 16/023* (2013.01); *H04L 12/28* (2013.01);
(Continued)

(58) Field of Classification Search
CPC ..... H04L 12/2838; H04L 12/40; H04L 12/46; H04L 12/28; H04L 2012/40215; H04L 2012/40273; B60R 16/023; H04W 4/48
See application file for complete search history.

(56) References Cited

U.S. PATENT DOCUMENTS 10,414,470 B1 * 9/2019 Hartman .............. G01C 13/002
10,757,228 B1 * 8/2020 Bhimavarapu .......... A61G 7/05
(Continued)

FOREIGN PATENT DOCUMENTS

CN 105164944 A * 12/2015 ............... G01V 1/16
CN 205211419 U * 5/2016
(Continued)

OTHER PUBLICATIONS

International Search Report, Application No. PCT/JP2021/020117, dated Jul. 13, 2021. ISA/Japan Patent Office.

*Primary Examiner* — Richard G Keehn
(74) *Attorney, Agent, or Firm* — Honigman LLP

(57) ABSTRACT

Provided is an onboard apparatus configured to connect to an other onboard apparatus via a first transmission path and a second transmission path, which are transmission paths of different types, the onboard apparatus comprising a control unit; and a transmission unit configured to transmit communication information to the other onboard apparatus, wherein the control unit, depending on contents of the communication information, selects at least one from among the first transmission path and the second transmission path as the transmission path to use to transmit the communication information and causes the transmission unit to transmit (Continued)

the communication information via a selected transmission path.

15 Claims, 8 Drawing Sheets

(51) Int. Cl.
    *H04L 12/28*     (2006.01)
    *H04L 12/40*     (2006.01)
    *H04L 12/46*     (2006.01)
    *H04W 4/48*     (2018.01)

(52) U.S. Cl.
    CPC .............. *H04L 12/40* (2013.01); *H04L 12/46* (2013.01); *H04W 4/48* (2018.02)

(56) References Cited

U.S. PATENT DOCUMENTS

| | | | | |
|---|---|---|---|---|
| 2010/0106860 A1* | 4/2010 | Li | ................ | H04L 12/4625 709/250 |
| 2011/0202229 A1* | 8/2011 | Owens | ................ | B60C 23/0406 701/31.4 |
| 2014/0210593 A1* | 7/2014 | Cattermole | ............ | G08C 17/02 340/12.5 |
| 2019/0058611 A1* | 2/2019 | Maeda | ................ | H04L 12/40 |
| 2019/0081817 A1* | 3/2019 | Sasaki | ................ | H04L 12/46 |
| 2019/0082016 A1* | 3/2019 | Sasaki | ................ | H04L 41/0806 |
| 2021/0184886 A1* | 6/2021 | Maeda | ................ | H04L 69/16 |
| 2021/0250340 A1* | 8/2021 | Green | ................ | H04L 63/0442 |
| 2022/0405085 A1* | 12/2022 | Abadie | ................ | G06F 8/656 |
| 2023/0216704 A1* | 7/2023 | Kobayashi | ............ | H04L 12/46 709/224 |

FOREIGN PATENT DOCUMENTS

| | | | | | |
|---|---|---|---|---|---|
| CN | 106961437 | A | * | 7/2017 | |
| CN | 108072373 | A | * | 5/2018 | ............. G01C 21/32 |
| CN | 109327369 | A | * | 2/2019 | ............. E21F 17/18 |
| CN | 109995631 | A | * | 7/2019 | ............. G06F 8/658 |
| DE | 102015218202 | B4 | * | 10/2022 | ............. H04L 12/40 |
| DE | 112010005786 | B4 | * | 3/2023 | ............. G01J 3/027 |
| EP | 3468104 | B1 | * | 5/2020 | ......... G06F 13/4221 |
| EP | 3761572 | A1 | * | 1/2021 | ............. H04L 12/40 |
| JP | 2002-044179 | A | | 2/2002 | |
| JP | 2004-343456 | A | | 12/2004 | |
| JP | 2008-271040 | A | | 11/2008 | |
| JP | 2014-199988 | A | | 10/2014 | |
| JP | 2019-186644 | A | | 10/2019 | |
| JP | 2020-088568 | A | | 6/2020 | |
| WO | WO-2011133273 | A1 | * | 10/2011 | ......... B64D 11/0015 |

\* cited by examiner

ONBOARD APPARATUS, ONBOARD COMMUNICATION SYSTEM, AND COMMUNICATION CONTROL METHOD

CROSS-REFERENCE TO RELATED APPLICATIONS

This application is the U.S. national stage of PCT/JP2021/020117, filed on May 27, 2021, which claims priority of Japanese Patent Application No. JP 2020-101979, filed on Jun. 12, 2020, the contents of which are incorporated herein.

TECHNICAL FIELD

The present disclosure relates to an onboard apparatus, an onboard communication system, and a communication control method.

BACKGROUND

An onboard communication system such as that described below is described in JP 2019-186644A. That is, an onboard communication system includes two onboard relay apparatuses that include a plurality of connection units that communication lines connect to and relay via transmitting and receiving messages via the plurality of communication lines connected to the connection units, wherein the two onboard relay apparatuses are connected via two or more communication lines, and each onboard relay apparatus includes a message transmission unit that selects one communication line from among the two or more communication lines in a predetermined order and transmits a message to be transmitted to the other onboard relay apparatus.

A known onboard communication system includes two onboard apparatuses that are connected via a plurality of communication lines and transmit and receive messages via the plurality of communication lines.

With the technique described in JP 2019-186644A, the communication load can be reduced by using a plurality of communication lines. However, for future onboard networks capable of transmitting and receiving various types of communication information, there is a demand for a technique for more effectively using a plurality of transmission paths.

The present disclosure is made in light of the problems described above and is directed at providing an onboard apparatus, an onboard communication system, and a communication control method capable of more effectively using a plurality of transmission paths in an onboard network.

SUMMARY

An onboard apparatus of the present disclosure is an onboard apparatus configured to connect to an other onboard apparatus via a first transmission path and a second transmission path, which are transmission paths of different types, the onboard apparatus including a control unit; and a transmission unit configured to transmit communication information to the other onboard apparatus, wherein the control unit, depending on contents of the communication information, selects at least one from among the first transmission path and the second transmission path as the transmission path to use to transmit the communication information and causes the transmission unit to transmit the communication information via a selected transmission path.

An onboard communication system of the present disclosure is an onboard communication system including a central onboard apparatus; and a plurality of peripheral onboard apparatuses configured to connect to the central onboard apparatus via a first transmission path and a second transmission path, which are transmission paths of different types, wherein each one of the plurality of peripheral onboard apparatuses are connected to the central onboard apparatus via the first transmission path on a one-to-one basis, and at least one of the plurality of peripheral onboard apparatuses is connected via a bus connection to the central onboard apparatus via the second transmission path.

A communication control method of the present disclosure is a communication control method for an onboard apparatus configured to connect to an other onboard apparatus via a first transmission path and a second transmission path, which are transmission paths of different types, the communication control method including depending on contents of communication information to be transmitted to the other onboard apparatus, selecting at least one from among the first transmission path and the second transmission path as the transmission path to use to transmit the communication information; and transmitting the communication information to the other onboard apparatus via the transmission path selected.

An aspect of the present disclosure is not necessarily implemented as an onboard apparatus including such an advantageous processing unit, and may be implemented as a program for causing a computer to execute advantageous processing steps, or as a semiconductor integrated circuit that implements a part of or all of the onboard apparatus.

Effects of Present Disclosure

According to the present disclosure, a plurality of transmission paths can be more effectively used in an onboard network.

DETAILED DESCRIPTION OF PREFERRED EMBODIMENTS

Figure 1:
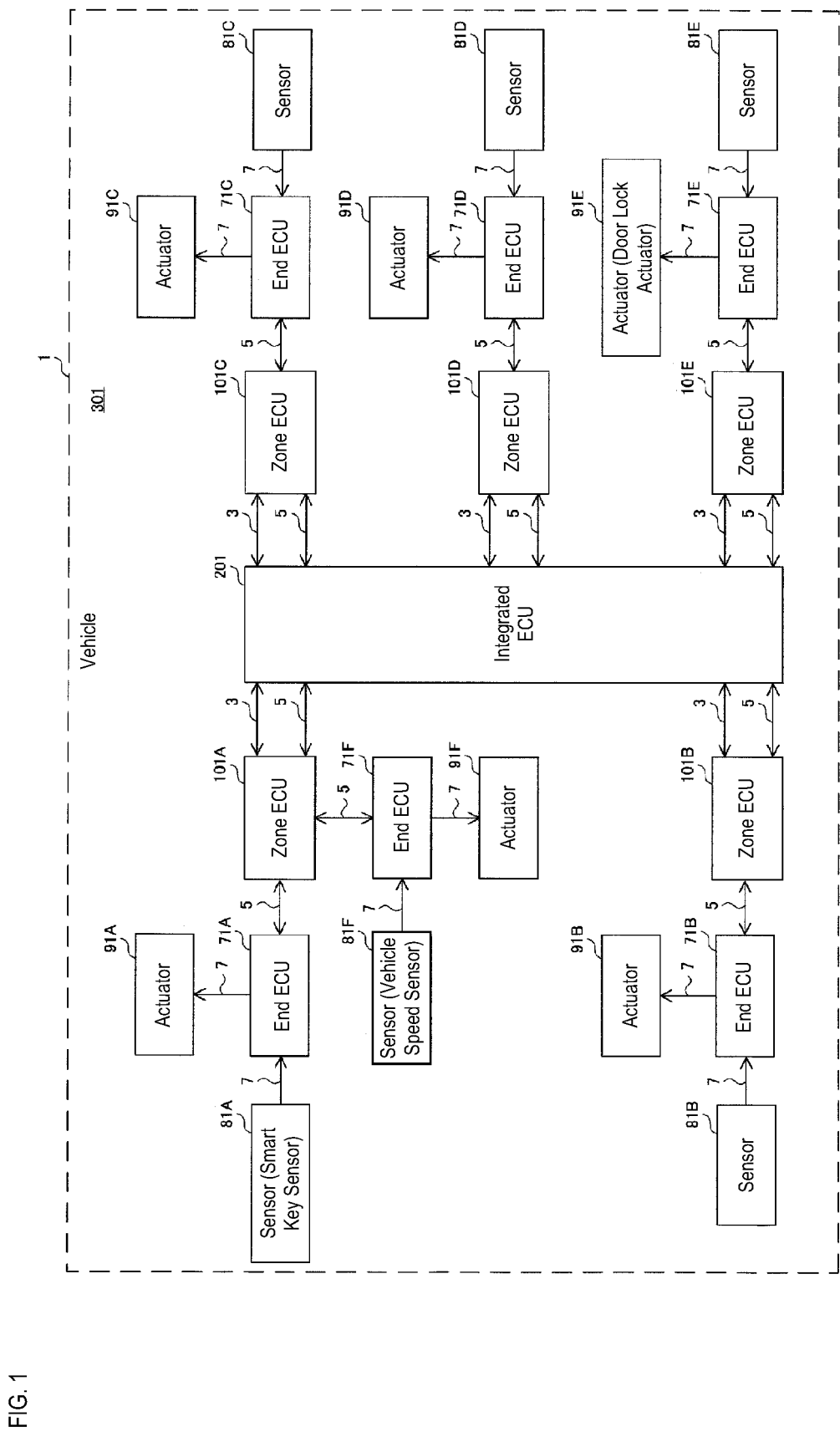
FIG. 1 is a diagram illustrating the configuration of an onboard communication system according to a first embodiment of the present disclosure.

Firstly, contents of embodiments of the present disclosure will be listed and described.

First Aspect

An onboard apparatus according to a first aspect of the present disclosure is an onboard apparatus configured to connect to an other onboard apparatus via a first transmission path and a second transmission path, which are transmission paths of different types, the onboard apparatus including a control unit; and a transmission unit configured to transmit communication information to the other onboard apparatus, wherein the control unit, depending on contents of the communication information, selects at least one from among the first transmission path and the second transmission path as the transmission path to use to transmit the communication information and causes the transmission unit to transmit the communication information via a selected transmission path.

In the first aspect, with a configuration in which a transmission path is selected depending on the contents of the communication information to be transmitted and the communication information is transmitted via the selected transmission path, the characteristics of each transmission path can be taken into account and the communication information can be transmitted via the more preferably transmission path for each piece of communication information. Thus, for example, the communication load can be reduced, and the reliability of communication when an abnormality occurs can be improved. Thus, the plurality of transmission paths can be more effectively used in the onboard network.

Second Aspect

In a second aspect, the second transmission path takes less time than the first transmission path to become able to communicate when transitioning from a sleep state or an inactive state to an active state, and the control unit selects the second transmission path as the transmission path to use to transmit communication information for activation, which is the communication information for activating the other onboard apparatus.

With the second aspect, the time taken until the other onboard apparatus activates can be reduced. Thus, for example, in an onboard communication system with a sleep function, the responsiveness upon activation can be increased.

Third Aspect

In a third aspect, the control unit selects the second transmission path as the transmission path to use to transmit the communication information to the other onboard apparatus just after activation.

With the third aspect, the communication information can be transmitted to the other onboard apparatus without waiting for the first transmission path to become able to communicate. Thus, the responsiveness can be further improved.

Fourth Aspect

In a fourth aspect, the second transmission path has a lower throughput than the first transmission path, and the control unit selects the first transmission path and does not select the second transmission path as the transmission path to use to transmit a specific type of the communication information.

With the fourth aspect, compared to a configuration in which both the first transmission path and the second transmission path are selected to transmit all of the communication information, the communication load of the second transmission path can be reduced.

Fifth Aspect

In a fifth aspect, the control unit, depending on a priority of the communication information to be transmitted to the other onboard apparatus, selects whether to use both the first transmission path and the second transmission path to transmit the communication information or whether to use one of the first transmission path or the second transmission path to transmit the communication information.

With the fifth aspect, for example, by using one of the first transmission path or the second transmission path to transmit the communication information with low priority and using both the first transmission path and the second transmission path to transmit the communication information with high priority, the communication information with high priority can be more reliably transmitted to the other onboard apparatus and the communication load can be reduced.

Sixth Aspect

In a sixth aspect, the control unit selects both the first transmission path and the second transmission path as the transmission path to use to transmit at least one of the communication information for running a vehicle in failsafe mode or the communication information to be transmitted when another onboard apparatus fails, selects the first transmission path as the transmission path to use to transmit at least one of the communication information to be transmitted when the vehicle is running normally or the communication information for performing driving assistance control of the vehicle, and selects the second transmission path as the transmission path to use to transmit the communication information for fault diagnosis of another onboard apparatus.

According the sixth aspect, the communication information can be transmitted via a more preferable transmission path taking into account the communication characteristics of the first transmission path and the second transmission path and the state of the vehicle and the onboard apparatus.

Seventh Aspect

In a seventh aspect, the first transmission path is a transmission path compliant with an Ethernet (registered trademark) protocol, and the second transmission path is a transmission path compliant with a Controller Area Network (CAN) (registered trademark) protocol.

"With the seventh aspect, the plurality of transmission paths can be more effectively used in the onboard network including a transmission path compliant with an Ethernet protocol and a transmission path compliant with a CAN protocol."

Eighth Aspect

An onboard communication system according to an eighth aspect of the present disclosure is an onboard communication system including a central onboard apparatus; and a plurality of peripheral onboard apparatuses configured to connect to the central onboard apparatus via a first transmission path and a second transmission path, which are transmission paths of different types, wherein each one of the plurality of peripheral onboard apparatuses are connected to the central onboard apparatus via the first transmission path on a one-to-one basis, and at least one of the plurality of peripheral onboard apparatuses is connected via a bus connection to the central onboard apparatus via the second transmission path.

In the eighth aspect, with a configuration in which the plurality of peripheral onboard apparatuses are connected via a bus connection to the central onboard apparatus via the second transmission path, compared to a configuration in which the peripheral onboard apparatuses are connected to the central onboard apparatus via the second transmission path on a one-to-one basis, the number of parts in the central onboard apparatus necessary for communication using the second transmission path, such as the communication ports and ICs for communication connected to the second transmission path, can be reduced. Thus, the plurality of transmission paths can be more effectively used in the onboard network.

Ninth Aspect

In a ninth aspect, all of the plurality of peripheral onboard apparatuses are connected via a bus connection to the central onboard apparatus via a single one of the second transmission paths.

With the ninth aspect, the number of parts in the central onboard apparatus necessary for communication using the second transmission path, such as the communication ports and ICs for communication connected to the second transmission path, can be further reduced.

Tenth Aspect

A communication control method according to tenth aspect of the present disclosure is a communication control method for an onboard apparatus configured to connect to an other onboard apparatus via a first transmission path and a second transmission path, which are transmission paths of different types, the communication control method including depending on contents of communication information to be transmitted to the other onboard apparatus, selecting at least one from among the first transmission path and the second transmission path as the transmission path to use to transmit the communication information; and transmitting the communication information to the other onboard apparatus via the transmission path selected.

In the tenth aspect, with a method in which a transmission path is selected depending on the contents of the communication information to be transmitted and the communication information is transmitted via the selected transmission path, the characteristics of each transmission path can be taken into account and the communication information can be transmitted via the more preferably transmission path for each piece of communication information. Thus, for example, the communication load can be reduced, and the reliability of communication when an abnormality occurs can be improved. Thus, the plurality of transmission paths can be more effectively used in the onboard network.

An embodiment of the present disclosure will be described below using diagrams. Note that the same or corresponding components in the diagrams are given the same reference sign, and redundant descriptions are not given. One or more parts of the embodiments described below may be combined in a discretionary manner.

Configuration and Basic Operation

FIG. 1 is a diagram illustrating the configuration of an onboard communication system according to a first embodiment of the present disclosure. As illustrated in FIG. 1, an onboard communication system 301 includes an integrated electronic control unit (ECU) 201, zone ECUs 101A, 101B, 101C, 101D, and 101E, end ECUs 71A, 71B, 71C, 71D, 71E, and 71F, sensors 81A, 81B, 81C, 81D, 81E, and 81F, and actuators 91A, 91B, 91C, 91D, 91E, and 91F. The onboard communication system 301 is installed in a vehicle 1.

Hereinafter, each of the zone ECUs 101A, 101B, 101C, 101D, and 101E may also be referred to as the zone ECU 101, and each of the end ECUs 71A, 71B, 71C, 71D, 71E, and 71F may also be referred to as the end ECU 71. The integrated ECU 201 is an example of an onboard apparatus and an example of a central onboard apparatus. The zone ECU 101 is an example of an onboard apparatus and an example of a peripheral onboard apparatus.

The zone ECU 101 is connected to the integrated ECU 201 via a transmission line 3. Specifically, the zone ECUs 101 are connected to the integrated ECU 201 via the transmission lines 3 on a one-to-one basis. The zone ECU 101 is also connected to the integrated ECU 201 via a transmission line 5. Specifically, the zone ECUs 101 are connected to the integrated ECU 201 via the transmission lines 5 on a one-to-one basis.

The end ECUs 71A and 71F are connected to the zone ECU 101A via the corresponding transmission lines 5. The end ECU 71B is connected to the zone ECU 101B via the transmission line 5. The end ECU 71C is connected to the zone ECU 101C via the transmission line 5. The end ECU 71D is connected to the zone ECU 101D via the transmission line 5. The end ECU 71E is connected to the zone ECU 101E via the transmission line 5.

The sensor 81A and the actuator 91A are connected to the end ECU 71A via corresponding transmission lines 7. The sensor 81B and the actuator 91B are connected to the end ECU 71B via the corresponding transmission lines 7. The sensor 81C and the actuator 91C are connected to the end ECU 71C via the corresponding transmission lines 7. The sensor 81D and the actuator 91D are connected to the end ECU 71D via the corresponding transmission lines 7. The sensor 81E and the actuator 91E are connected to the end ECU 71E via the corresponding transmission lines 7. The sensor 81F and the actuator 91F are connected to the end ECU 71F via the corresponding transmission lines 7. Hereinafter, each one of the sensors 81A, 81B, 81C, 81D, 81E, and 81F may be referred to as the sensor 81, and each one of the actuators 91A, 91B, 91C, 91D, 91E, and 91F may be referred to as the actuator 91.

The transmission lines 3 and 5, for example, are transmission paths compliant with one of the protocols from among CAN, FlexRay (registered trademark), Media Oriented Systems Transport (MOST) (registered trademark), Ethernet, and Local Interconnect Network (LIN). The transmission line 7 is a signal line capable of transmitting an analog signal, for example.

The transmission line 3 and the transmission line 5 are different types of transmission paths. The transmission line 3 is an example of a first transmission path. The transmission line 5 is an example of a second transmission path. Hereinafter, the transmission line 3 is a transmission path compliant with an Ethernet protocol, and the transmission line 5 is a transmission path compliant with a CAN protocol.

Note that the onboard communication system 301 may have a configuration including two or more integrated ECUs 201. Also, the onboard communication system 301 may have a configuration including one, two, three, four, or six or more zone ECUs 101.

The end ECU 71 acquires measurement results from the sensor 81 connected to itself. For example, the sensor 81 includes various measurement devices, such as a camera, an illumination sensor, a vehicle speed sensor, a smart key sensor, and the like. The sensor 81 periodically or irregularly performs measurement and transmits an analog signal indicating the measurement results to the corresponding end ECU 71 via the transmission line 7. The end ECU 71 receives the analog signal from the sensor 81 connected to itself and performs Analog Digital (AD) conversion of the analog signal for a predetermined sampling period to generate measurement information indicating the measurement results. For example, the end ECU 71 periodically transmits the generated measurement information to the zone ECU 101 connected to itself. Alternatively, in a case where the generated measurement information satisfies a predetermined condition, the end ECU 71 generates detection information and transmits the generated detection information to the zone ECU 101 connected to itself. Specifically, the end ECU 71 stores the generated measurement information or detection information in a CAN frame and transmits the information to the corresponding zone ECU 101 via the transmission line 5.

For example, the sensor 81A is a smart key sensor capable of measuring radio waves output from a smart key. The end ECU 71A acquires the measurement results from the sensor 81A and generates measurement information indicating the acquired measurement results. For example, in a case where the generated measurement information satisfies a predetermined condition, the end ECU 71A generates key detection information, which is detection information indicating that a smart key is located near the vehicle 1, and transmits the generated key detection information to the zone ECU 101A.

For example, the sensor 81F is a vehicle speed sensor. The end ECU 71F acquires the measurement results from the sensor 81F and generates vehicle speed information indicating the acquired measurement results. For example, the end ECU 71F periodically transmits the generated measurement information to the zone ECU 101F.

Also, the end ECU 71 drives the actuator 91 connected to itself. Specifically, the zone ECU 101 stores control information for controlling the actuator 91 in a CAN frame and transmits this information to the corresponding end ECU 71 via the transmission line 5. The end ECU 71 generates a drive signal on the basis of the received control information and transmits the generated drive signal to the corresponding actuator 91 via the transmission line 7. The actuator 91 operations according to the drive signal received from the end ECU 71.

For example, the actuator 91E is a door lock actuator. The actuator 91E receives a drive signal from the end ECU 71E and locks or unlocks the door according to the received drive signal.

The network configuration of the onboard communication system 301 is a central area type. Specifically, each zone ECU 101 transmits the measurement information or detection information received from the end ECU 71 connected to itself to the integrated ECU 201. The integrated ECU 201 is a central apparatus that processes the measurement information and detection information received from the zone ECUs 101. The integrated ECU 201 generates control information for controlling the actuators 91 and transmits the generated control information to the zone ECUs 101. Each zone ECU 101 transmits the control information received from the integrated ECU 201 to the end ECU 71 connected to itself. The measurement information, detection information, and control information are examples of communication information. In a central area type network configuration, a simple method such as updating the firmware of the integrated ECU 201 can be used to add an additional function to the onboard communication system 301. Thus, this configuration is flexible in terms of the needs for adding functions to the onboard communication system 301.

Zone ECU

Figure 2:
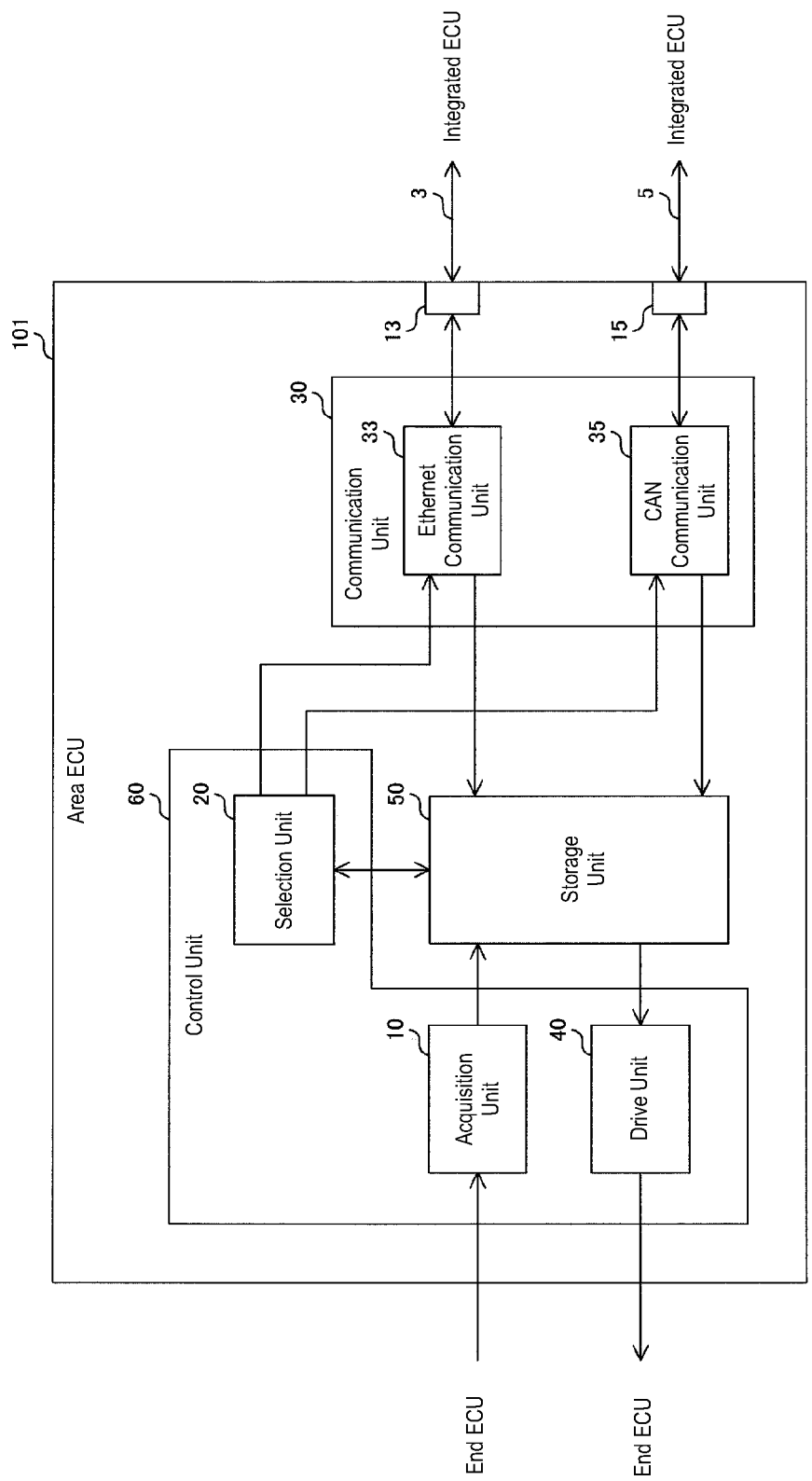
FIG. 2 is a diagram illustrating the configuration of a zone ECU according to the first embodiment of the present disclosure.

FIG. 2 is a diagram illustrating the configuration of the zone ECU according to the first embodiment of the present disclosure. As illustrated in FIG. 2, the zone ECU 101 includes communication ports 13 and 15, a communication unit 30, a storage unit 50, and a control unit 60. The communication unit 30 includes an Ethernet communication unit 33 and a CAN communication unit 35. The control unit 60 includes an acquisition unit 10, a selection unit 20, and a drive unit 40. The communication unit 30 and the control unit 60, for example, are implemented by a processor, such as a Central Processing Unit (CPU), a Digital Signal Processor (DSP), or the like. The Ethernet communication unit 33 and the CAN communication unit 35 are Integrated Circuits (IC) for communication, for example. The storage unit 50 is a non-volatile memory, for example. The communication unit 30 is an example of a transmission unit.

The communication port 13 is connected to the integrated ECU 201 via the transmission line 3, and the communication port 15 is connected to the integrated ECU 201 via the transmission line 5.

The communication unit 30 receives the control information from the integrated ECU 201. Specifically, the Ethernet communication unit 33 of the communication unit 30 receives an Ethernet frame storing the control information from the integrated ECU 201 via the transmission line 3 and the communication port 13. The Ethernet communication unit 33 acquires the control information from the received Ethernet frame and stores the control information in the storage unit 50. Also, the CAN communication unit 35 of the communication unit 30 receives a CAN frame storing the control information from the integrated ECU 201 via the transmission line 5 and the communication port 15. The CAN communication unit 35 acquires the control information from the received CAN frame and stores the control information in the storage unit 50.

When the control information is stored in the storage unit 50 by the communication unit 30, the drive unit 40 acquires the control information from the storage unit 50, stores the received control information in the CAN frame, and transmits the control information to the corresponding end ECU 71 via the transmission line 5.

The acquisition unit 10 receives the detection information or the measurement information from the end ECU 71. The acquisition unit 10 stores the received detection information or measurement information in the storage unit 50. For example, the acquisition unit 10 in the zone ECU 101A receives the vehicle speed information from the end ECU 71F and stores the received vehicle speed information in the storage unit 50. Also, for example, the acquisition unit 10 in the zone ECU 101A receives the key detection information from the end ECU 71A and stores the received key detection information in the storage unit 50.

The communication unit 30 transmits communication information, such as the detection information or the measurement information, to the integrated ECU 201. The control unit 60, depending on the contents of the communication information, selects at least one from among the transmission line 3 and the transmission line 5 as the transmission path to use to transmit the communication information and causes the communication unit 30 to transmit the communication information via the selected transmission path.

Specifically, the selection unit 20 of the control unit 60 acquires communication information, such as the detection information or the measurement information, from the storage unit 50 and outputs the acquired communication information to the communication unit 30. The communication unit 30 transmits the communication information received from the selection unit 20 to the integrated ECU 201. The selection unit 20, depending on the contents of the communication information to be transmitted to the integrated ECU 201, selects at least one from among the transmission line 3 compliant with an Ethernet protocol and the transmission line 5 compliant with a CAN protocol as the transmission path to use to transmit the communication information.

For example, in a case where only the transmission line 3 is selected as the transmission path to use to transmit the communication information by the selection unit 20, the communication information is output to only the Ethernet communication unit 33 of the communication unit 30. Also, for example, in a case where only the transmission line 5 is selected as the transmission path to use to transmit the communication information by the selection unit 20, the communication information is output to only the CAN communication unit 35 of the communication unit 30. Also, for example, in a case where the transmission line 3 and the transmission line 5 are selected as the transmission paths to use to transmit the communication information by the selection unit 20, the communication information is output to both the Ethernet communication unit 33 and the CAN communication unit 35.

When the Ethernet communication unit 33 of the communication unit 30 receives the communication information from the selection unit 20, the Ethernet communication unit 33 generates an Ethernet frame including the communication information as a message and including a MAC address of the integrated ECU 201 as the destination MAC address and transmits the generated Ethernet frame to the integrated ECU 201 via the communication port 13 and the transmission line 3. Also, when the CAN communication unit 35 of the communication unit 30 receives the communication information from the selection unit 20, the CAN communication unit 35 generates a CAN frame including the communication information as a message and transmits the generated CAN frame to the integrated ECU 201 via the communication port 15 and the transmission line 5.

Integrated ECU

Figure 3:
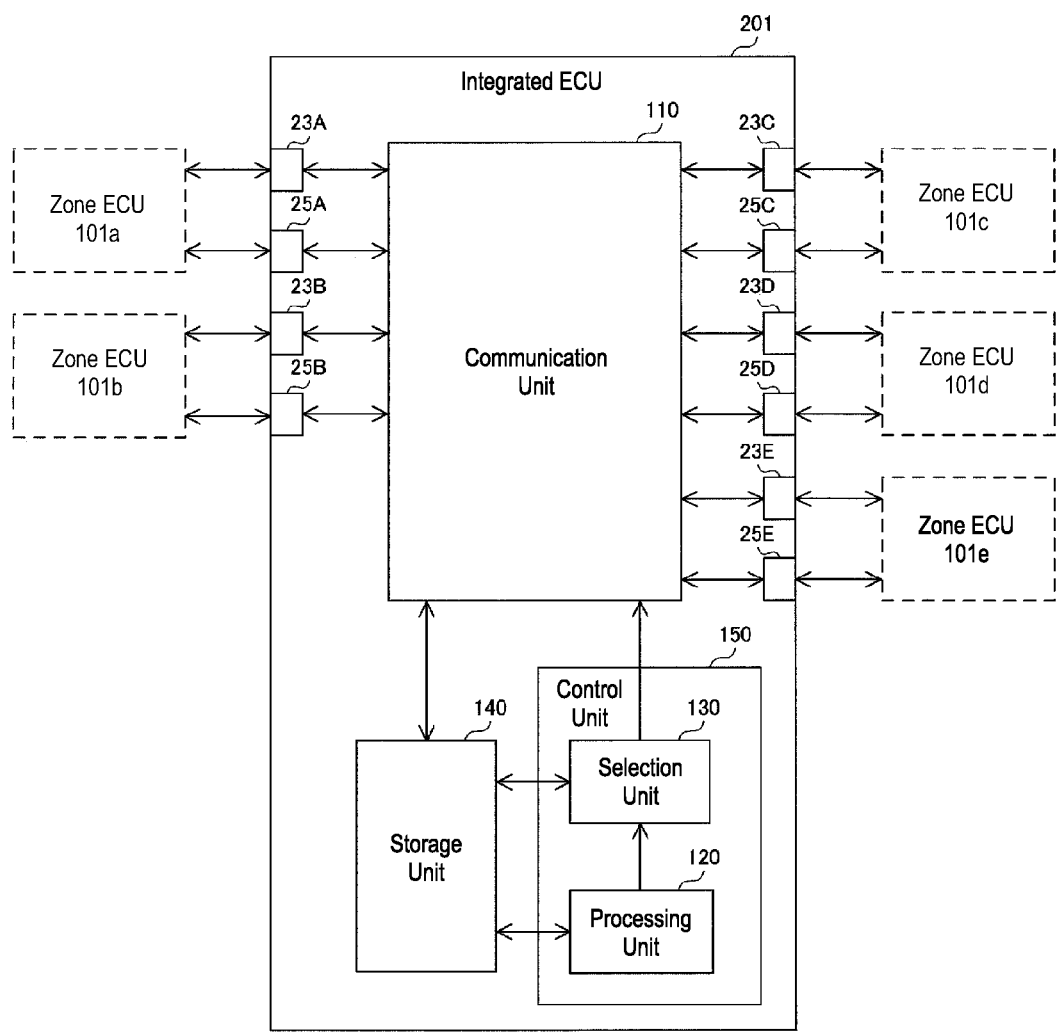
FIG. 3 is a diagram illustrating the configuration of an integrated ECU according to the first embodiment of the present disclosure.

FIG. 3 is a diagram illustrating the configuration of the integrated ECU according to the first embodiment of the present disclosure. As illustrated in FIG. 3, the integrated ECU 201 includes communication ports 23A, 23B, 23C, 23D, and 23E, communication ports 25A, 25B, 25C, 25D, and 25E, a communication unit 110, a storage unit 140, and a control unit 150. The control unit 150 includes a processing unit 120 and a selection unit 130. The communication unit 110, the processing unit 120, and the selection unit 130 are implemented by a processor, such as a CPU, a DSP, or the like, for example. The storage unit 140 is a non-volatile memory, for example. The communication unit 110 includes a not-illustrated plurality of Ethernet communication units provided for the communication ports 23 and a not-illustrated plurality of CAN communication units provided for the communication ports 25. The plurality of Ethernet communication units and the plurality of CAN communication units are ICs for communication, for example. The communication unit 110 is an example of a transmission unit.

The communication port 23A is connected to the zone ECU 101A via the transmission line 3, and the communication port 25A is connected to the zone ECU 101A via the transmission line 5. The communication port 23B is connected to the zone ECU 101B via the transmission line 3, and the communication port 25B is connected to the zone ECU 101B via the transmission line 5. The communication port 23C is connected to the zone ECU 101C via the transmission line 3, and the communication port 25C is connected to the zone ECU 101C via the transmission line 5. The communication port 23D is connected to the zone ECU 101D via the transmission line 3, and the communication port 25D is connected to the zone ECU 101D via the transmission line 5. The communication port 23E is connected to the zone ECU 101E via the transmission line 3, and the communication port 25E is connected to the zone ECU 101E via the transmission line 5. Hereinafter, each one of the communication ports 23A, 23B, 23C, 23D, and 23E may be referred to as the communication port 23, and each one of the communication ports 25A, 25B, 25C, 25D, and 25E may be referred to as the communication port 25.

The communication unit 110 receives communication information from the zone ECU 101. Specifically, the Ethernet communication unit of the communication unit 110 receives the Ethernet frame storing the communication information from the corresponding zone ECU 101 via the transmission line 3 and the communication port 23, acquires the detection information or the measurement information from the received Ethernet frame, and stores this information in the storage unit 140. Also, the CAN communication unit of the communication unit 110 receives the CAN frame storing the detection information or the measurement information from the corresponding zone ECU 101 via the transmission line 5 and the communication port 25, acquires the detection information or the measurement information from the received CAN frame, and stores this information in the storage unit 140.

For example, the communication unit 110 receives the vehicle speed information from the zone ECU 101A and stores the received vehicle speed information in the storage unit 140. Also, for example, the communication unit 110 receives the key detection information from the zone ECU 101A and stores the received key detection information in the storage unit 50.

The processing unit 120 acquires the detection information or the measurement information from the storage unit 140 and processes the acquired detection information or measurement information to generate the control information for controlling the actuator 91. The processing unit 120 outputs the generated control information and destination information indicating the MAC address of the destination zone ECU 101 to the selection unit 130. For example, the processing unit 120 acquires the key detection information from the storage unit 140 and processes the acquired key detection information to generate the control information for controlling the actuator 91E, which is the door lock actuator. Also, the processing unit 120 outputs the generated control information and destination information indicating the MAC address of the zone ECU 101E to the selection unit 130.

Also, the processing unit 120 may acquire the detection information or the measurement information from the storage unit 140 and output the acquired detection information or the measurement information as is to the selection unit 130. Specifically, the processing unit 120 acquires the key detection information from the storage unit 140 and outputs the acquired key detection information and the destination information to the selection unit 130.

The communication unit 110 transmits the communication information to the zone ECU 101. The control unit 150, depending on the contents of the communication information, selects at least one from among the transmission line 3 and the transmission line 5 as the transmission path to use to transmit the communication information and causes the communication unit 110 to transmit the communication information via the selected transmission path.

Specifically, the selection unit 130 of the control unit 60 receives the control information from the processing unit 120, the communication information, such as the detection information, the measurement information, and the like, and the destination information and outputs the received communication information and the destination information to the communication unit 110. The communication unit 110 transmits the communication information received from the selection unit 130 to the zone ECU 101 indicated by the destination information. The selection unit 130, depending on the contents of the communication information to be transmitted to the zone ECU 101, selects at least one from among the transmission line 3 compliant with an Ethernet protocol and the transmission line 5 compliant with a CAN protocol as the transmission path to use to transmit the communication information.

For example, in a case where only the transmission line 3 is selected as the transmission path to use to transmit the communication information by the selection unit 130, the communication information and the destination information are output to only the Ethernet communication unit of the communication unit 110. Also, for example, in a case where only the transmission line 5 is selected as the transmission path to use to transmit the communication information by the selection unit 130, the communication information and the destination information are output to only the CAN communication unit of the communication unit 110. Also, for example, in a case where the transmission line 3 and the transmission line 5 are selected as the transmission paths to use to transmit the communication information by the selection unit 130, the communication information and the destination information are output to both the Ethernet communication unit and the CAN communication unit.

When the Ethernet communication unit of the communication unit 110 receives the communication information and the destination information from the selection unit 130, the Ethernet communication unit generates an Ethernet frame including the communication information as a message and including a MAC address indicating the destination information as a destination MAC address and transmits the generated Ethernet frame to the destination zone ECU 101 via the communication port 23 and the transmission line 3. Also, when the CAN communication unit of the communication unit 110 receives the communication information and the destination information from the selection unit 130, the CAN communication unit generates a CAN frame including the communication information as a message and transmits the generated CAN frame to the destination zone ECU 101 via the communication port 25 and the transmission line 5.

Example 1 of Selection by the Selection Unit

The transmission line 5 compliant with a CAN protocol takes less time than the transmission line 3 compliant with an Ethernet protocol to become able to communicate when transitioning from a sleep state or an inactive state to an active state.

For example, the communication unit 30 of the zone ECU 101 and the communication unit 110 of the integrated ECU 201 enter a sleep state or an inactive state when the ignition power supply of the vehicle 1 is turned off.

Selection Unit of Zone ECU

The selection unit 20 of the zone ECU 101 selects the transmission line 5 as the transmission path to use to transmit the key detection information, which is the communication information for activating the integrated ECU 201.

Specifically, when the key detection information is stored in the storage unit 50 by the acquisition unit 10, the selection unit 20 outputs the activation information for activating the communication unit 30 to the Ethernet communication unit 33 and the CAN communication unit 35. Then, the selection unit 20 monitors the communication unit 30 and, when the CAN communication unit 35 activates and enters a state of being able to transmit the communication information, acquires the key detection information from the storage unit 50 and outputs the key detection information to the CAN communication unit 35. The key detection information is an example of communication information for activation.

Selection Unit of Integrated ECU

The selection unit 130 of the integrated ECU 201 selects the transmission line 5 as the transmission path to use to transmit the key detection information, which is the communication information for activating the zone ECU 101.

Specifically, when the key detection information is received by the processing unit 120, the selection unit 130 outputs the activation information for activating the communication unit 110 to the Ethernet communication unit and the CAN communication unit of the communication unit 110. Then, the selection unit 130 monitors the communication unit 110 and, when the CAN communication unit activates and enters a state of being able to transmit the communication information, outputs the key detection information to the CAN communication unit.

Example 2 of Selection by the Selection Unit

Selection unit of Zone ECU

The selection unit 20 selects the transmission line 5 as the transmission path to use to transmit the communication information to the integrated ECU 201 just after activation.

In a period from when the key detection information is transmitted to the integrated ECU 201 by the CAN communication unit 35 until a predetermined amount of time has elapsed, when the selection unit 20 of the zone ECU 101A acquires the vehicle speed information from the storage unit 50, the acquired vehicle speed information is output to the CAN communication unit 35.

After the integrated ECU 201 having acquired the key detection information transitions from a sleep state or an inactive state to an active state, the selection unit 20 acquires the vehicle speed information from the storage unit 50 and outputs the vehicle speed information to the CAN communication unit 35.

For example, when the communication unit 110 of the integrated ECU 201 transitions from a sleep state or an inactive state to an active state via the key detection information from the zone ECU 101 received via the CAN communication unit of the communication unit 110, the communication unit 110 transmits activation complete information to the zone ECU 101 via the transmission line 5 as a response to the key detection information. When the CAN communication unit 35 of the communication unit 30 of the zone ECU 101 receives the activation complete information from the integrated ECU 201 via the communication port 15, the received activation complete information is stored in the storage unit 50. When the activation complete information is stored in the storage unit 50 by the CAN communication unit 35, the selection unit 20 recognizes that the integrated ECU 201 is active, acquires the vehicle speed information from the storage unit 50, and outputs the vehicle speed information to the CAN communication unit 35.

Alternatively, after a predetermined amount of time has elapsed from when the key detection information is transmitted to the integrated ECU 201 by the CAN communication unit 35 of the communication unit 30, the selection unit 20 assumes that the integrated ECU 201 has activated, acquires the vehicle speed information from the storage unit 50, and outputs the vehicle speed information to the CAN communication unit 35.

Selection unit of Integrated ECU

The selection unit 130 selects the transmission line 5 as the transmission path to use to transmit the communication information to the zone ECU 101 just after activation.

In a period from when the key detection information is transmitted to the zone ECU 101 by the CAN communication unit of the communication unit 110 until a predetermined amount of time has elapsed, when the selection unit 130 of the integrated ECU 201 receives the vehicle speed information from the processing unit 120, the received vehicle speed information is output to the CAN communication unit of the communication unit 110.

After the zone ECU 101 having acquired the key detection information transitions from a sleep state or an inactive state to an active state, the selection unit 130 outputs the vehicle speed information to the CAN communication unit.

For example, when the communication unit 30 of the zone ECU 101 transitions from a sleep state or an inactive state to an active state via the key detection information from the integrated ECU 201 received via the CAN communication unit 35, the communication unit 30 of the zone ECU 101 transmits activation complete information to the integrated ECU 201 via the transmission line 5 as a response to the key detection information. When the CAN communication unit of the communication unit 110 of the integrated ECU 201 receives the activation complete information from the zone ECU 101 via the communication port 25, the received activation complete information is stored in the storage unit 140. When the activation complete information is stored in the storage unit 140 by the CAN communication unit, the selection unit 130 recognizes that the zone ECU 101 is active and outputs the vehicle speed information received from the processing unit 120 to the CAN communication unit.

Alternatively, after a predetermined amount of time has elapsed from when the key detection information is transmitted to the zone ECU 101 by the CAN communication unit of the communication unit 110, the selection unit 130 assumes that the zone ECU 101 has activated and outputs the vehicle speed information received from the processing unit 120 to the CAN communication unit.

Example 3 of Selection by the Selection Unit

The transmission line 5 compliant with a CAN protocol has a lower throughput than the transmission line 3 compliant with an Ethernet protocol, for example. The selection units 20 and 130 select the transmission line 3 as the transmission path to use to transmit a specific type of communication information but do not select the transmission line 5.

Selection Unit of Zone ECU

When the selection unit 20 of the zone ECU 101 acquires a specific type of communication information from the storage unit 50, the selection unit 20 outputs the acquired communication information to the Ethernet communication unit 33 but does not output the acquired communication information to the CAN communication unit 35.

For example, depending on the priority of the communication information to be transmitted to the integrated ECU 201, the selection unit 20 selects whether to use both the transmission line 3 and the transmission line 5 to transmit the communication information or whether to use one of the transmission line 3 or the transmission line 5 to transmit the communication information.

Specifically, in the communication information to be transmitted to the integrated ECU 201, a priority corresponding to the type of the communication information is set. When the selection unit 20 acquires communication information with a priority of a predetermined value or greater from the storage unit 50, for example, the selection unit 20 selects both the transmission line 3 and the transmission line 5 as the transmission path to use to transmit the acquired communication information and outputs the communication information to both the Ethernet communication unit 33 and the CAN communication unit 35. However, when the selection unit 20 acquires communication information with a priority less than the predetermined value from the storage unit 50, for example, the selection unit 20 selects one of the Ethernet communication unit 33 or the CAN communication unit 35 as the transmission path to use to transmit the acquired communication information and outputs the communication information to the one selected.

For example, the selection unit 20 selects both the transmission line 3 and the transmission line 5 as the transmission path to use to transmit at least one from among communication information C1 for running the vehicle 1 in failsafe mode or communication information C2 to be transmitted when another onboard apparatus fails. Specifically, in the communication information C1 for running the vehicle 1 in failsafe mode and the communication information C2 to be transmitted when another onboard apparatus fails, a high priority is set. When the selection unit 20 acquires the communication information C1 or the communication information C2 from the storage unit 50, the acquired communication information is output to both the Ethernet communication unit 33 and the CAN communication unit 35.

Also, for example, the selection unit 20 selects the transmission line 3 as the transmission path to use to transmit at least one of communication information C3 to be transmitted when the vehicle 1 is running normally or communication information C4 for performing driving assistance control of the vehicle 1. Specifically, in the communication information C3 to be transmitted when running normal and the communication information C4 for performing driving assistance control, a low priority is set. When the selection unit 20 acquires the communication information C3 or the communication information C4 from the storage unit 50, the acquired communication information is output to the Ethernet communication unit 33. Specifically, when the selection unit 20 acquires communication information relating to the Advanced Driver Assistance Systems (ADAS) function, which is an example of the communication information C4, from the storage unit 50, the acquired communication information is output to the Ethernet communication unit 33.

Also, for example, the selection unit 20 selects the transmission line 5 as the transmission path to use to transmit communication information C5 for fault diagnosis of another onboard apparatus. Specifically, in the communication information C5 for fault diagnosis for another onboard apparatus, a low priority is set. When the selection unit 20 acquires the communication information C5 from the storage unit 50, the acquired communication information C5 is output to the CAN communication unit 35.

Note that the selection unit 20 may be configured to select either the transmission line 3 or the transmission line 5 as the transmission path to use to transmit the communication information C1 and C2. Also, the selection unit 20 may be configured to select the transmission line 5 as the transmission path to use to transmit the communication information C3 and C4. Also, the selection unit 20 may be configured to select the transmission line 3 as the transmission path to use to transmit the communication information C5.

Selection Unit of Integrated ECU

When the selection unit 130 of the integrated ECU 201 receives a specific type of communication information from the processing unit 120, the selection unit 130 outputs the acquired communication information to the Ethernet communication unit but does not output the acquired communication information to the CAN communication unit.

For example, depending on the priority of the communication information to be transmitted to the zone ECU 101, the selection unit 130 selects whether to use both the transmission line 3 and the transmission line 5 to transmit the communication information or whether to use one of the transmission line 3 or the transmission line 5 to transmit the communication information.

Specifically, in the communication information to be transmitted to the zone ECU 101, a priority corresponding to the type of the communication information is set. When the selection unit 130 receives communication information with a priority of a predetermined value or greater from the processing unit 120, for example, the selection unit 130 selects both the transmission line 3 and the transmission line 5 as the transmission path to use to transmit the received communication information and outputs the communication information to both the Ethernet communication unit and the CAN communication unit of the communication unit 110. However, when the selection unit 130 receives communication information with a priority less than the predetermined value from the processing unit 120, for example, the selection unit 20 selects one of the Ethernet communication unit or the CAN communication unit as the transmission path to use to transmit the received communication information and outputs the communication information to the one selected.

For example, the selection unit 130 selects both the transmission line 3 and the transmission line 5 as the transmission path to use to transmit at least one from among communication information C11 for running the vehicle 1 in failsafe mode or communication information C12 to be transmitted when another onboard apparatus fails. Specifically, in the communication information C11 for running the vehicle 1 in failsafe mode and the communication information C12 to be transmitted when another onboard apparatus fails, a high priority is set. When the selection unit 130 receives the communication information C11 or the communication information C12 from the processing unit 120, the received communication information is output to both the Ethernet communication unit and the CAN communication unit.

Also, for example, the selection unit 130 selects the transmission line 3 as the transmission path to use to transmit at least one of communication information C13 to be transmitted when the vehicle 1 is running normally or communication information C14 for performing driving assistance control of the vehicle 1. Specifically, in the communication information C13 to be transmitted when running normally and the communication information C14 for performing driving assistance control, a low priority is set. When the selection unit 130 receives the communication information C13 or the communication information C14 from the processing unit 120, the received communication information is output to the Ethernet communication unit. Specifically, when the selection unit 130 receives the communication information relating to the ADAS function, which is an example of the communication information C14, from the processing unit 120, the received communication information is output to the Ethernet communication unit.

Also, for example, the selection unit 130 selects the transmission line 5 as the transmission path to use to transmit communication information C15 for fault diagnosis of another onboard apparatus. Specifically, in the communication information C15 for fault diagnosis for another onboard apparatus, a low priority is set. When the selection unit 130 receives the communication information C15 from the processing unit 120, the received communication information C15 is output to the CAN communication unit.

Note that the selection unit 130 may be configured to select either the transmission line 3 or the transmission line 5 as the transmission path to use to transmit the communication information C11 and C12. Also, the selection unit 130 may be configured to select the transmission line 5 as the transmission path to use to transmit the communication information C13 and C14. Also, the selection unit 130 may be configured to select the transmission line 3 as the transmission path to use to transmit the communication information C15.

Operation Flow

Each apparatus in the onboard communication system according to an embodiment of the present disclosure includes a computer including a memory. An arithmetic processing unit such as a CPU in each computer reads out a program including at least one or all of the steps of the following flowchart and sequence and executes the program. The programs of these apparatuses may be installed from an external device or the like. The programs of these apparatuses may each be distributed while stored in a storage medium or distributed via a communication line.

Figure 4:
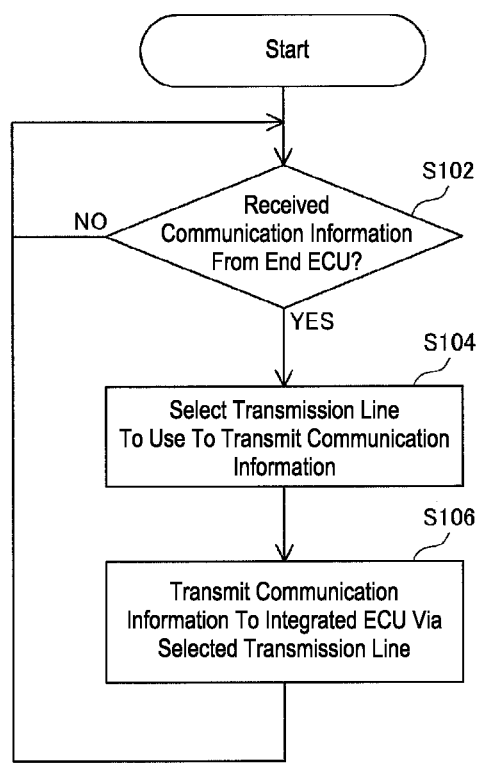
FIG. 4 is a flowchart illustrating an example of the operation process according to the first embodiment of the present disclosure when the zone ECU transmits communication information to the integrated ECU.

FIG. 4 is a flowchart illustrating an example of the operation process according to the first embodiment of the present disclosure when the zone ECU transmits communication information to the integrated ECU.

As illustrated in FIG. 4, first, the zone ECU 101 is on standby to receive communication information from the end ECU 71 (NO in step S102), and when the zone ECU 101 receives communication information from the end ECU 71 (YES in step S102), depending on the contents of the received communication information, the zone ECU 101 selects at least one from among the transmission line 3 compliant with an Ethernet protocol and the transmission line 5 compliant with a CAN protocol as the transmission path to use to transmit the communication information (step S104).

Next, the zone ECU 101 transmits the communication information to the integrated ECU 201 via the selected transmission line (step S106).

Then, the zone ECU 101 standbys to receive new communication information from the end ECU 71 (NO in step S102).

Figure 5:
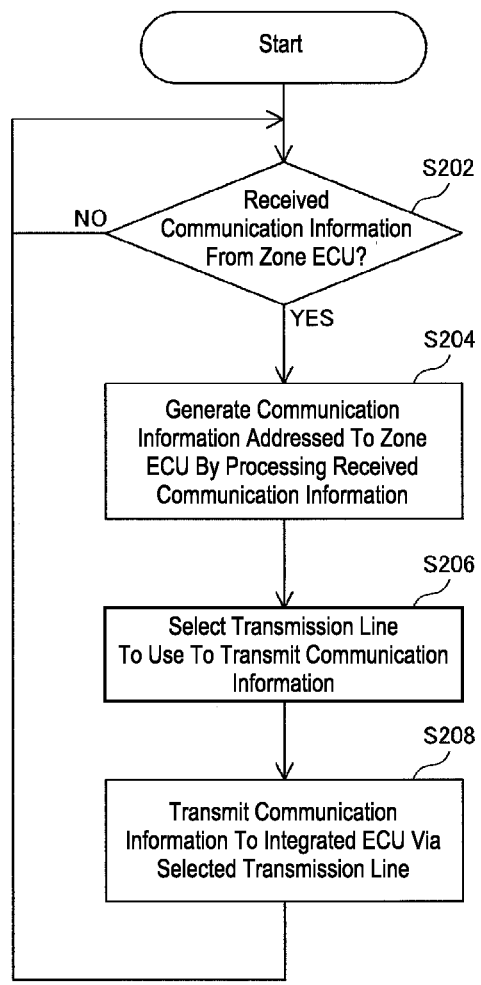
FIG. 5 is a flowchart illustrating an example of the operation process according to the first embodiment of the present disclosure when the integrated ECU transmits communication information to the zone ECU.

FIG. 5 is a flowchart illustrating an example of the operation process according to the first embodiment of the present disclosure when the integrated ECU transmits communication information to the zone ECU.

As illustrated in FIG. 5, first, the integrated ECU 201 is in standby to receive communication information from the zone ECU 101 (NO in step S202), and when communication information is received from the zone ECU 101 (YES in step S202), the integrated ECU 201 processes the received communication information and generates control information for controlling the actuator 91, in other words communication information with the zone ECU 101 as the destination (step S204).

Next, the integrated ECU 201, depending on the contents of the generated communication information, selects at least one from among the transmission line 3 compliant with an Ethernet protocol and the transmission line 5 compliant with a CAN protocol as the transmission path to use to transmit the communication information (step S206).

Next, the integrated ECU 201 transmits the communication information to the zone ECU 101 via the selected transmission line (step S208).

Then, the integrated ECU 201 standbys to receive new communication information from the zone ECU 101 (NO in step S202).

Figure 6:
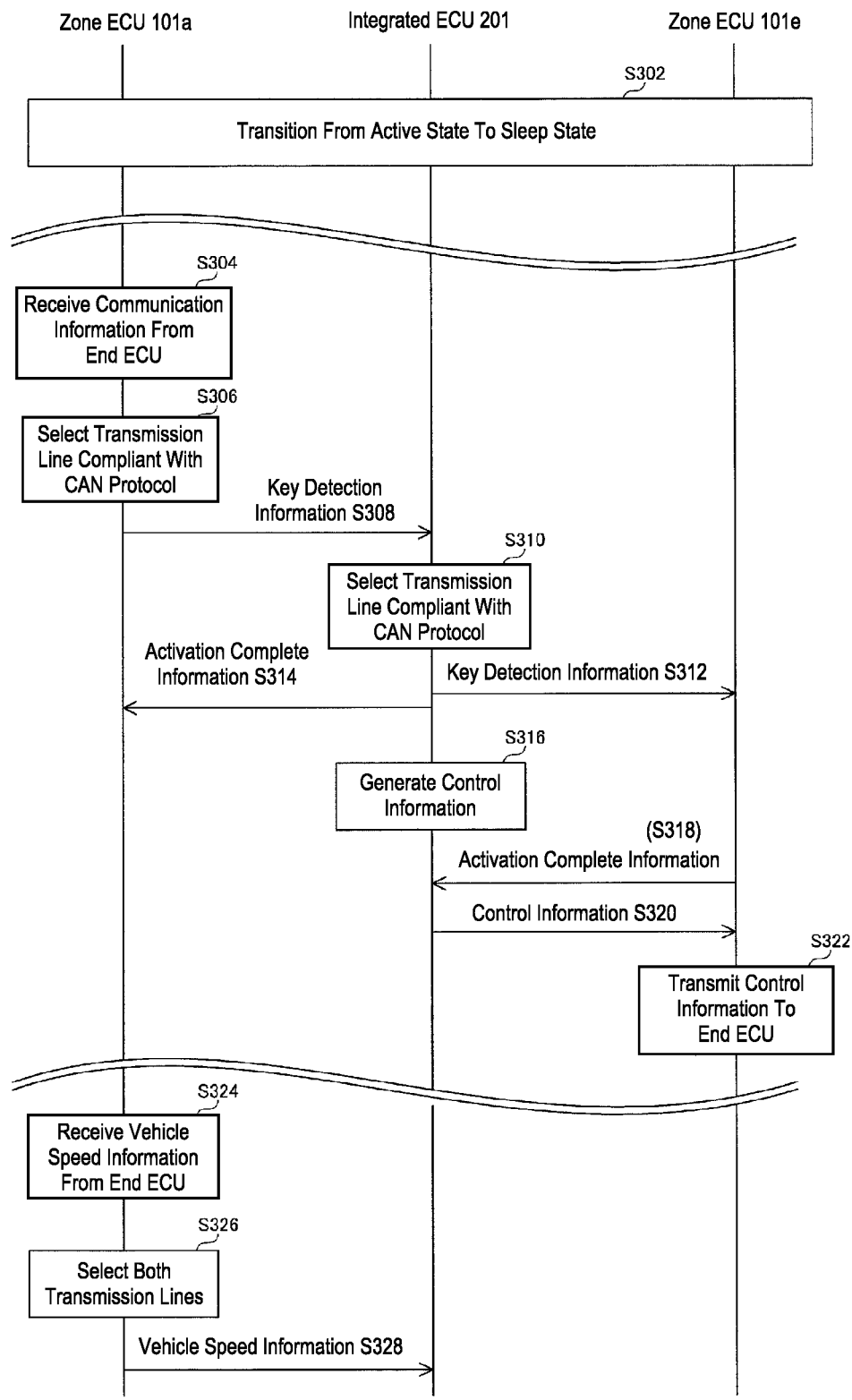
FIG. 6 is a diagram illustrating an example of the sequence of the communication processing of the onboard communication system according to the first embodiment of the present disclosure.

FIG. 6 is a diagram illustrating an example of the sequence of the communication processing of the onboard communication system according to the first embodiment of the present disclosure.

As illustrated in FIG. 6, first, the zone ECU 101A, the zone ECU 101E, and the integrated ECU 201, for example, transition from an active state to a sleep state when the ignition power supply of the vehicle 1 switches to off (step S302).

Next, for example, the zone ECU 101A receives the key detection information from the end ECU 71A (step S304).

Then, the zone ECU 101A selects the transmission line 5 compliant with a CAN protocol as the transmission path to use to transmit the key detection information (step S306).

Next, when the CAN communication unit 35 of the communication unit 30 activates and enters a state of being able to transmit the communication information, the zone ECU 101A transmits the key detection information to the integrated ECU 201 via the transmission line 5 (step S308).

Then, when the integrated ECU 201 receives the key detection information from the zone ECU 101A, the integrated ECU 201 selects the transmission line 5 compliant with a CAN protocol as the transmission path to use to transmit the key detection information (step S310).

Next, when the CAN communication unit of the communication unit 110 activates and enters a state of being able to transmit the communication information, the integrated ECU 201 transmits the key detection information to the zone ECU 101E via the transmission line 5 (step S312).

Also, the integrated ECU 201 transmits the activation complete information to the zone ECU 101A via the transmission line 5 (step S314).

Next, the integrated ECU 201 processes the key detection information to generate the control information for controlling the actuator 91E, which is the door lock actuator (step S316).

Next, when the CAN communication unit 35 of the communication unit 30 activates and enters a state of being able to transmit the communication information, the zone ECU 101E transmits the activation complete information to the integrated ECU 201 via the transmission line 5 (step S318).

Then, the integrated ECU 201 recognizes that the zone ECU 101E has activated by receiving the activation complete information from the zone ECU 101E and transmits the control information to the zone ECU 101E via the transmission line 5 (step S320).

Next, when the zone ECU 101E receives the control information from the integrated ECU 201, the zone ECU 101E transmits the control information to the end ECU 71E to cause the end ECU 71E to release the door lock using the actuator 91E (step S322).

Next, for example, the zone ECU 101A receives the vehicle speed information from the end ECU 71F (step S324).

Then, the zone ECU 101A selects both the transmission line 3 compliant with an Ethernet protocol and the transmission line 5 compliant with a CAN protocol as the transmission path to use to transmit the vehicle speed information (step S326).

Next, the zone ECU 101A transmits the vehicle speed information to the integrated ECU 201 via the transmission lines 3 and 5 (step S328).

Note that the onboard communication system 301 according to an embodiment of the present disclosure has a configuration in which the selection unit 20 of the zone ECU 101 selects the transmission line 5 as the transmission path to use to transmit the key detection information. However, no such limitation is intended. The selection unit 20 may be configured to select the transmission line 3 as the transmission path to use to transmit the key detection information. Also, the onboard communication system 301 according to an embodiment of the present disclosure has a configuration in which the selection unit 130 of the integrated ECU 201 selects the transmission line 5 as the transmission path to use to transmit the key detection information. However, no such limitation is intended. The selection unit 130 may be configured to select the transmission line 3 as the transmission path to use to transmit the key detection information.

Also, the onboard communication system 301 according to an embodiment of the present disclosure has a configuration in which the selection unit 20 of the zone ECU 101 selects the transmission line 5 as the transmission path to use to transmit the communication information to the integrated ECU 201 just after activation. However, no such limitation is intended. The selection unit 20 may be configured to select the transmission line 3 as the transmission path to use to transmit the communication information to the integrated ECU 201 just after activation. Also, the onboard communication system 301 according to an embodiment of the present disclosure has a configuration in which the selection unit 130 of the integrated ECU 201 selects the transmission line 5 as the transmission path to use to transmit the communication information to the zone ECU 101 just after activation. However, no such limitation is intended. The selection unit 130 may be configured to select the transmission line 3 as the transmission path to use to transmit the communication information to the zone ECU 101 just after activation.

Also, the onboard communication system 301 according to an embodiment of the present disclosure has a configuration in which the selection unit 20 of the zone ECU 101 does not select the transmission line 5 as the transmission path to use to transmit a specific type of communication information. However, no such limitation is intended. The selection unit 20 may be configured to select the transmission line 5 as the transmission path to use to transmit the all types of communication information. Also, the onboard communication system 301 according to an embodiment of the present disclosure has a configuration in which the selection unit 130 of the integrated ECU 201 does not select the transmission line 5 as the transmission path to use to transmit a specific type of communication information. However, no such limitation is intended. The selection unit 130 may be configured to select the transmission line 5 as the transmission path to use to transmit the all types of communication information.

Also, the onboard communication system 301 according to an embodiment of the present disclosure has a configuration in which, depending on the priority of the communication information to be transmitted to the integrated ECU 201, the selection unit 20 of the zone ECU 101 selects whether to use both the transmission line 3 and the transmission line 5 to transmit the communication information or whether to use one of the transmission line 3 or the transmission line 5 to transmit the communication information. However, no such limitation is intended. The selection unit 20 may be configured to select whether to use both the transmission line 3 and the transmission line 5 to transmit the communication information or whether to use one of the transmission line 3 or the transmission line 5 to transmit the communication information regardless of the priority of the communication information to be transmitted. Also, the onboard communication system 301 according to an embodiment of the present disclosure has a configuration in which, depending on the priority of the communication information to be transmitted to the zone ECU 101, the selection unit 130 of the integrated ECU 201 selects whether to use both the transmission line 3 and the transmission line 5 to transmit the communication information or whether to use one of the transmission line 3 or the transmission line 5 to transmit the communication information. However, no such limitation is intended. The selection unit 130 may be configured to select whether to use both the transmission line 3 and the transmission line 5 to transmit the communication information or whether to use one of the transmission line 3 or the transmission line 5 to transmit the communication information regardless of the priority of the communication information to be transmitted.

There is a demand of a technique that enables a plurality of transmission paths to be more effectively used in an onboard network.

Regarding this, the zone ECU 101 according to the first embodiment of the present disclosure is connected to the integrated ECU 201 via the transmission line 3 and the transmission line 5, which are different types of transmission paths. In the zone ECU 101, the communication unit 30 transmits the communication information to the integrated ECU 201. The control unit 60, depending on the contents of the communication information, selects at least one from among the transmission line 3 and the transmission line 5 as the transmission path to use to transmit the communication information and causes the communication unit 30 to transmit the communication information via the selected transmission path.

Also, the integrated ECU 201 according to the first embodiment of the present disclosure is connected to the zone ECU 101 via the transmission line 3 and the transmission line 5, which are different types of transmission paths. In the integrated ECU 201, the communication unit 110 transmits the communication information to the zone ECU 101. The control unit 150, depending on the contents of the communication information, selects at least one from among the transmission line 3 and the transmission line 5 as the transmission path to use to transmit the communication information and causes the communication unit 110 to transmit the communication information via the selected transmission path.

Also, the communication control method according to the first embodiment of the present disclosure is a communication control method for the zone ECU 101 connected to the integrated ECU 201 via the transmission line 3 and the transmission line 5, which are different types of transmission paths. In the communication control method, first, depending on the contents of the communication information to be transmitted to the integrated ECU 201, the zone ECU 101 selects at least one from among the transmission line 3 and the transmission line 5 as the transmission path to use to transmit the communication information. Next, the zone ECU 101 transmits the communication information to the integrated ECU 201 via the selected transmission path.

Also, the communication control method according to the first embodiment of the present disclosure is a communication control method for the integrated ECU 201 connected to the zone ECU 101 via the transmission line 3 and the transmission line 5, which are different types of transmission paths. In the communication control method, first, depending on the contents of the communication information to be transmitted to the zone ECU 101, the integrated ECU 201 selects at least one from among the transmission line 3 and the transmission line 5 as the transmission path to use to transmit the communication information. Next, the integrated ECU 201 transmits the communication information to the zone ECU 101 via the selected transmission path.

In this manner, with a configuration and method in which a transmission path is selected depending on the contents of the communication information to be transmitted and the communication information is transmitted via the selected transmission path, the characteristics of each transmission path can be taken into account and the communication information can be transmitted via the more preferably transmission path for each piece of communication information. Thus, for example, the communication load can be reduced, and the reliability of communication when an abnormality occurs can be improved.

Accordingly, with the zone ECU 101 and the integrated ECU 201 according to the first embodiment of the present disclosure, a plurality of transmission paths can be more effectively used in an onboard network.

Next, another embodiment of the present disclosure will be described using diagrams. Note that the same or corresponding components in the diagrams are given the same reference sign, and redundant descriptions are not given.

Second Embodiment

Compared to the onboard communication system 301 according to the first embodiment, the present embodiment relates to an onboard communication system 302 in which at least one portion of the zone ECU 101 is connected via a bus connection to the integrated ECU 201 via the transmission line 5. The contents not described below are similar to that of the onboard communication system 301 according to the first embodiment.

Figure 7:
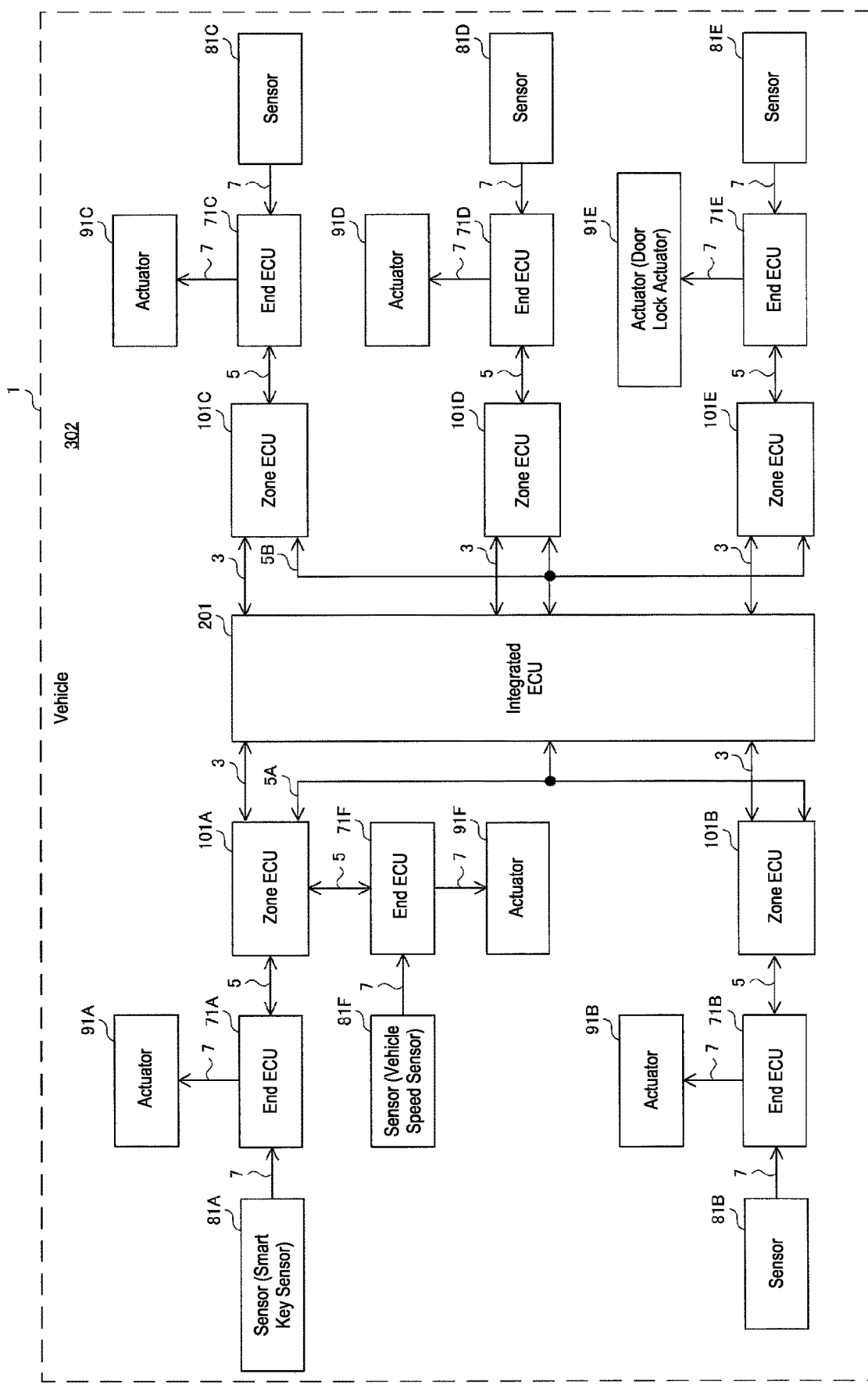
FIG. 7 is a diagram illustrating an example of the configuration of an onboard communication system according to the second embodiment of the present disclosure.

FIG. 7 is a diagram illustrating an example of the configuration of an onboard communication system according to the second embodiment of the present disclosure. As illustrated in FIG. 7, the zone ECUs 101 are connected to the integrated ECU 201 via transmission lines 3 on a one-to-one basis. Also, the zone ECUs 101A and 101B are connected via a bus connection to the integrated ECU 201 via a transmission line 5A, which is the transmission line 5. Also, the zone ECUs 101C, 101D, and 101E are connected via a bus connection to the integrated ECU 201 via a transmission line 5B, which is the transmission line 5.

Figure 8:
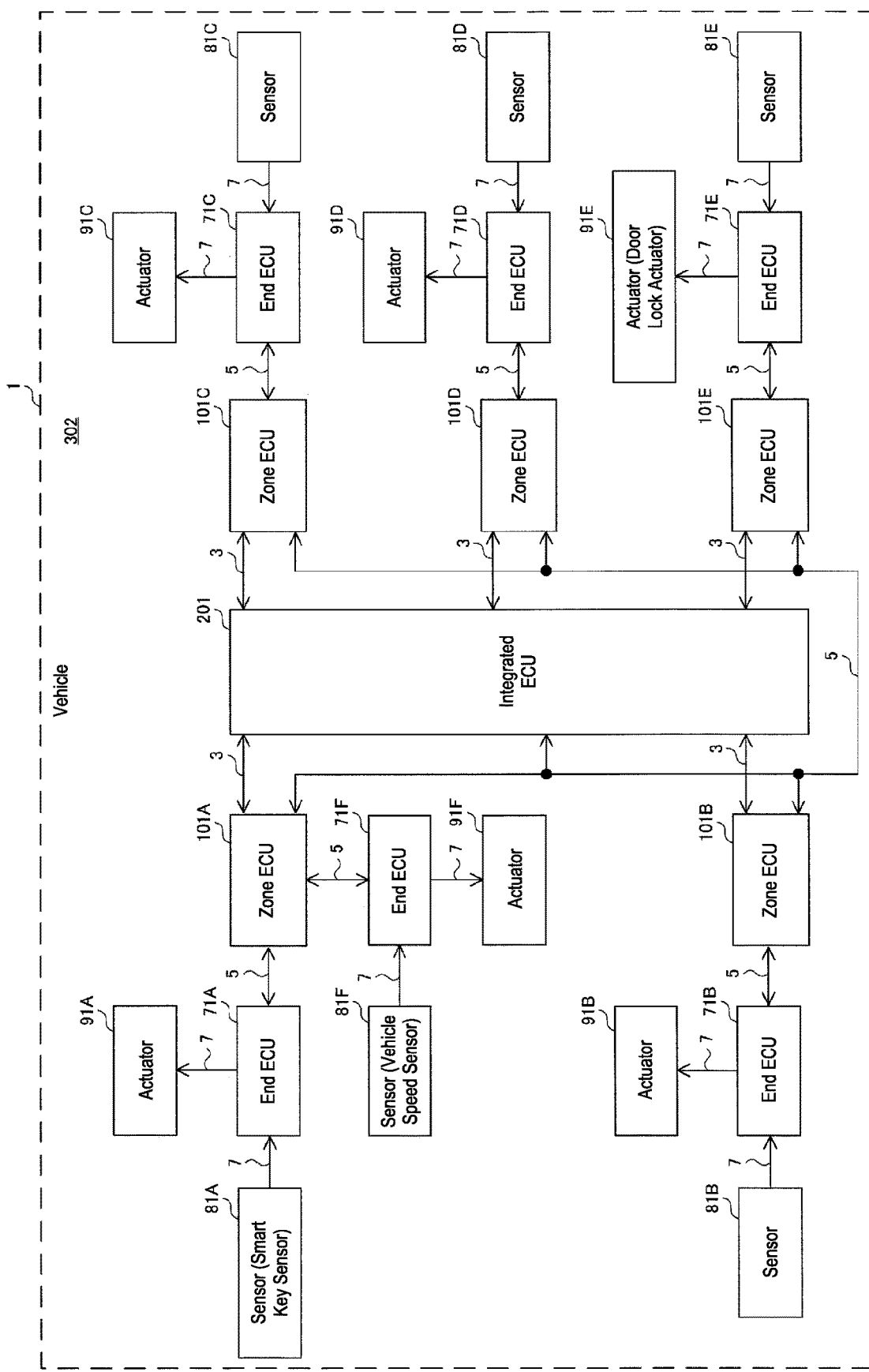
FIG. 8 is a diagram illustrating another example of the configuration of the onboard communication system according to the second embodiment of the present disclosure.

FIG. 8 is a diagram illustrating another example of the configuration of the onboard communication system according to the second embodiment of the present disclosure. As illustrated in FIG. 8, all of the zone ECUs 101 are connected via a bus connection to the integrated ECU 201 via the transmission lines 5.

As described above, in the onboard communication system 302 according to the second embodiment of the present disclosure, the zone ECUs 101 are connected to the integrated ECU 201 via the transmission lines 3 on a one-to-one basis. The zone ECUs 101A and 101B are connected via a bus connection to the integrated ECU 201 via the transmission line 5A. The zone ECUs 101C, 101D, and 101E are connected via a bus connection to the integrated ECU 201 via the transmission line 5B.

In this manner, with a configuration in which the plurality of zone ECUs 101 are connected via a bus connection to the integrated ECU 201 via the transmission lines 5, compared to a configuration in which the zone ECUs 101 are connected to the integrated ECU 201 via the transmission lines 5 on a one-to-one basis, the number of parts in the integrated ECU 201 necessary for communication using the transmission lines 5, such as the communication ports and ICs for communication connected to the transmission lines 5, can be reduced.

Accordingly, with the onboard communication system according to the second embodiment of the present disclosure, a plurality of transmission paths can be more effectively used in an onboard network.

The embodiments described above are examples in all respects and should not be interpreted as limiting in any manner. The scope of the present invention is defined not by the foregoing description, but by the scope of the claims, and all modifications that are equivalent to or within the scope of the claims are included. The description includes the following supplement features.

Supplement 1

An onboard apparatus configured to connect to an other onboard apparatus via a first transmission path and a second transmission path, which are transmission paths of different types, the onboard apparatus including:
 a control unit; and
 a transmission unit configured to transmit communication information to the other onboard apparatus, wherein
 the control unit, depending on contents of the communication information, selects at least one from among the first transmission path and the second transmission path as the transmission path to use to transmit the communication information and causes the transmission unit to transmit the communication information via a selected transmission path,
 the first transmission path is a transmission path compliant with an Ethernet protocol,
 the second transmission path is a transmission path compliant with a CAN protocol, and
 the onboard apparatus is connected via a bus connection to the other onboard apparatus via the second transmission path.

Supplement 2

An onboard apparatus configured to connect to an other onboard apparatus via a first transmission path and a second transmission path, which are transmission paths of different types, the onboard apparatus including:
 a control unit; and
 a transmission unit configured to transmit communication information to the other onboard apparatus, wherein
 the control unit, depending on contents of the communication information, selects at least one from among the first transmission path and the second transmission path as the transmission path to use to transmit the communication information and causes the transmission unit to transmit the communication information via a selected transmission path, and
 the control unit and the transmission unit are implemented by a processor.

Supplement 3

An onboard communication system including:
 a central onboard apparatus; and
 a plurality of peripheral onboard apparatuses configured to connect to the central onboard apparatus via a first transmission path and a second transmission path, which are transmission paths of different types, wherein
 each one of the plurality of peripheral onboard apparatuses are connected to the central onboard apparatus via the first transmission path on a one-to-one basis, at least one of the plurality of peripheral onboard apparatuses is connected via a bus connection to the central onboard apparatus via the second transmission path,
 the first transmission path is a transmission path compliant with an Ethernet protocol,
 the second transmission path is a transmission path compliant with a CAN protocol,
 the peripheral onboard apparatus transmits, to the central onboard apparatus, measurement information indicating measurement results from a sensor or detection information indicating that the measurement information satisfies a predetermined condition, and
 the central onboard apparatus, on the basis of at least one of the measurement information or the detection information received from the peripheral onboard apparatus, generates control information for controlling an actuator and transmits the generated control information to the peripheral onboard apparatus.

Supplement 4

An onboard communication system including:
 a central onboard apparatus; and
 a plurality of peripheral onboard apparatuses configured to connect to the central onboard apparatus via a first transmission path and a second transmission path, which are transmission paths of different types, wherein
 each one of the plurality of peripheral onboard apparatuses are connected to the central onboard apparatus via the first transmission path on a one-to-one basis,
 at least one of the plurality of peripheral onboard apparatuses is connected via a bus connection to the central onboard apparatus via the second transmission path,
 the first transmission path is a transmission path compliant with an Ethernet protocol,
 the second transmission path is a transmission path compliant with a CAN protocol,
 the central onboard apparatus is an integrated ECU, and
 the peripheral onboard apparatus is a zone ECU.

The invention claimed is:

1. An onboard apparatus configured to connect to an other onboard apparatus via a first transmission path and a second transmission path, which are transmission paths of different types, the onboard apparatus comprising:
 a control unit; and
 a transmission unit configured to transmit communication information to the other onboard apparatus, wherein
the control unit, depending on contents of the communication information, selects at least one from among the first transmission path and the second transmission path as the transmission path to use to transmit the communication information and causes the transmission unit to transmit the communication information via a selected transmission path; wherein
 the second transmission path takes less time than the first transmission path to become able to communicate when transitioning from a sleep state or an inactive state to an active state, and
 the control unit selects the second transmission path as the transmission path to use to transmit communication information for activation, which is the communication information for activating the other onboard apparatus.

2. The onboard apparatus according to claim 1, wherein the control unit selects the second transmission path as the transmission path to use to transmit the communication information to the other onboard apparatus just after activation.

3. The onboard apparatus according to claim 2, wherein the second transmission path has a lower throughput than the first transmission path, and
the control unit selects the first transmission path and does not select the second transmission path as the transmission path to use to transmit a specific type of the communication information.

4. The onboard apparatus according to claim 2, wherein the first transmission path is a transmission path compliant with an Ethernet protocol, and
the second transmission path is a transmission path compliant with a Controller Area Network (CAN) protocol.

5. The onboard apparatus according to any one of claim 1, wherein
the second transmission path has a lower throughput than the first transmission path, and
the control unit selects the first transmission path and does not select the second transmission path as the transmission path to use to transmit a specific type of the communication information.

6. The onboard apparatus according to claim 5, wherein the control unit, depending on a priority of the communication information to be transmitted to the other onboard apparatus, selects whether to use both the first transmission path and the second transmission path to transmit the communication information or whether to use one of the first transmission path or the second transmission path to transmit the communication information.

7. The onboard apparatus according to claim 6, wherein the control unit
selects both the first transmission path and the second transmission path as the transmission path to use to transmit at least one of the communication information for running a vehicle in failsafe mode or the communication information to be transmitted when another onboard apparatus fails,
selects the first transmission path as the transmission path to use to transmit at least one of the communication information to be transmitted when the vehicle is running normally or the communication information for performing driving assistance control of the vehicle, and
selects the second transmission path as the transmission path to use to transmit the communication information for fault diagnosis of another onboard apparatus.

8. The onboard apparatus according to claim 6, wherein the first transmission path is a transmission path compliant with an Ethernet protocol, and
the second transmission path is a transmission path compliant with a Controller Area Network (CAN) protocol.

9. The onboard apparatus according to claim 5, wherein the control unit
selects both the first transmission path and the second transmission path as the transmission path to use to transmit at least one of the communication information for running a vehicle in failsafe mode or the communication information to be transmitted when another onboard apparatus fails,
selects the first transmission path as the transmission path to use to transmit at least one of the communication information to be transmitted when the vehicle is running normally or the communication information for performing driving assistance control of the vehicle, and
selects the second transmission path as the transmission path to use to transmit the communication information for fault diagnosis of another onboard apparatus.

10. The onboard apparatus according to claim 9, wherein the first transmission path is a transmission path compliant with an Ethernet protocol, and
the second transmission path is a transmission path compliant with a Controller Area Network (CAN) protocol.

11. The onboard apparatus according to claim 5, wherein the first transmission path is a transmission path compliant with an Ethernet protocol, and
the second transmission path is a transmission path compliant with a Controller Area Network (CAN) protocol.

12. The onboard apparatus according to claim 1, wherein the first transmission path is a transmission path compliant with an Ethernet protocol, and
the second transmission path is a transmission path compliant with a Controller Area Network (CAN) protocol.

13. An onboard communication system comprising:
a central onboard apparatus; and
a plurality of peripheral onboard apparatuses configured to connect to the central onboard apparatus via a first transmission path and a second transmission path, which are transmission paths of different types, wherein
each one of the plurality of peripheral onboard apparatuses are connected to the central onboard apparatus via the first transmission path on a one-to-one basis, and
at least one of the plurality of peripheral onboard apparatuses is connected via a bus connection to the central onboard apparatus via the second transmission path; wherein
the central onboard apparatus selects ones of the first transmission path and the second transmission path depending on a content of a communication information processed by the central onboard apparatus;
the second transmission path takes less time than the first transmission path to become able to communicate when transitioning from a sleep state or an inactive state to an active state; and
the control unit selects the second transmission path as the transmission path to use to transmit communication information for activation, which is the communication information for activating the other onboard apparatus.

14. The onboard communication system according to claim 13, wherein all of the plurality of peripheral onboard apparatuses are connected via a bus connection to the central onboard apparatus via a single one of the second transmission paths.

15. A communication control method for an onboard apparatus configured to connect to an other onboard apparatus via a first transmission path and a second transmission path, which are transmission paths of different types, the communication control method comprising:
depending on contents of communication information to be transmitted to the other onboard apparatus, selecting at least one from among the first transmission path and the second transmission path as the transmission path to use to transmit the communication information; and
transmitting the communication information to the other onboard apparatus via the transmission path selected; wherein the second transmission path takes less time than the first transmission path to become able to communicate when transitioning from a sleep state or an inactive state to an active state, and the control unit selects the second transmission path as the transmission path to use to transmit communication information for activation, which is the communication information for activating the other onboard apparatus.

\* \* \* \* \*